United States Patent
Yang et al.

(10) Patent No.: US 11,282,404 B1
(45) Date of Patent: Mar. 22, 2022

(54) METHOD FOR GENERATING SENSE OF REALITY OF VIRTUAL OBJECT IN TEACHING SCENE

(71) Applicant: Central China Normal University, Hubei (CN)

(72) Inventors: Zongkai Yang, Hubei (CN); Zheng Zhong, Hubei (CN); Di Wu, Hubei (CN); Ke Wu, Hubei (CN)

(73) Assignee: Central China Normal University, Wuhan (CN)

( * ) Notice: Subject to any disclaimer, the term of this patent is extended or adjusted under 35 U.S.C. 154(b) by 0 days.

(21) Appl. No.: 17/397,859

(22) Filed: Aug. 9, 2021

(30) Foreign Application Priority Data

Dec. 11, 2020 (CN) .......................... 202011458753.9

(51) Int. Cl.
 *G06T 19/00* (2011.01)
 *G09B 5/06* (2006.01)
 (Continued)

(52) U.S. Cl.
 CPC ............... *G09B 5/06* (2013.01); *G06F 3/012* (2013.01); *G06F 3/017* (2013.01); *G06T 7/579* (2017.01);
 (Continued)

(58) Field of Classification Search
 CPC .. G09B 5/06; G09B 5/10; G06F 3/012; G06F 3/017; G06T 7/579; G06T 15/005;
 (Continued)

(56) References Cited

U.S. PATENT DOCUMENTS 10,387,485 B2 * 8/2019 Goyal ................. G06F 16/5854
2007/0248261 A1 * 10/2007 Zhou ..................... G06T 19/006
 382/154
(Continued)

FOREIGN PATENT DOCUMENTS

CN 107479706 A 5/2017
CN 106951079 A 7/2017
(Continued)

OTHER PUBLICATIONS

Zongkai Yang, Qingtang Liu; Research and development of web-based virtual online classroom; Feb. 28, 2007 Department of information and technology, Central China Normal University, Wuhan, China.

(Continued)

*Primary Examiner* — Phong X Nguyen
(74) *Attorney, Agent, or Firm* — Wayne IP LLC (57) ABSTRACT

A method for generating sense of reality of a virtual object in a teaching scene includes perception of a teaching space, generation of sense of reality of a virtual object and generation of real effect of dynamic interaction. The method is specifically performed through steps of collecting depth data of the teaching space; perceiving changes of a scene object in a field of view in real time; collecting a light intensity in the teaching scene to realize a virtual-real fused lighting effect; generating a shadow effect of the virtual object in real time by using ShadowMap; and guiding a teacher to use a multi-modal algorithm to complete a real-time interaction with the virtual object by setting interactive prompts of a sight target and a virtual hand.

3 Claims, 6 Drawing Sheets

(51) Int. Cl.
*G09B 5/10* (2006.01)
*G06F 3/01* (2006.01)
*G06T 15/04* (2011.01)
*G06T 15/06* (2011.01)
*G06T 15/00* (2011.01)
*G06T 17/00* (2006.01)
*G06T 7/579* (2017.01)
*G06T 15/50* (2011.01)

(52) U.S. Cl.
CPC ............ *G06T 15/005* (2013.01); *G06T 15/04* (2013.01); *G06T 15/06* (2013.01); *G06T 15/506* (2013.01); *G06T 17/005* (2013.01); *G06T 19/006* (2013.01); *G09B 5/10* (2013.01); *G06T 2207/10028* (2013.01); *G06T 2210/12* (2013.01)

(58) Field of Classification Search
CPC ....... G06T 15/04; G06T 15/06; G06T 15/506; G06T 17/005; G06T 19/006; G06T 2207/10028; G06T 2210/12
See application file for complete search history.

(56) References Cited

U.S. PATENT DOCUMENTS

| | | | |
|---|---|---|---|
| 2015/0123966 A1* | 5/2015 | Newman | G06T 19/006 345/419 |
| 2016/0026253 A1* | 1/2016 | Bradski | H04N 13/167 345/8 |
| 2018/0018826 A1* | 1/2018 | Maier | G05B 19/409 |
| 2019/0310756 A1* | 10/2019 | Vathauer | G06F 3/04842 |
| 2020/0066049 A1* | 2/2020 | Sun | A63F 13/80 |
| 2020/0234487 A1* | 7/2020 | Clapp | G06T 19/006 |
| 2021/0097875 A1* | 4/2021 | Alexander, IV | G06T 19/00 |
| 2021/0134065 A1* | 5/2021 | Ramani | G06F 3/012 |
| 2021/0394046 A1* | 12/2021 | Yen | A63F 13/212 |

FOREIGN PATENT DOCUMENTS

| | | |
|---|---|---|
| CN | 111428726 A | 7/2020 |
| CN | 111525552 A | 8/2020 |
| WO | 9850884 A2 | 11/1998 |

OTHER PUBLICATIONS

Zheng Zhong, Weidong Chen, Dongbo Zhou, Yue Zhang, Feiyue Xue, Wanru Ge; Experimental Study on Spatial Cognition Effect Based on Panoramic Video; Nov. 29, 2018; National Mathematics Learning Engineering Technology Research Center, Central China Normal University, Wuhan, China.

Zhang Kun, Jiang Pengpeng, Hua Liang, Fei Minrui, Zhou Huiyu; Investigation of accurate detection of large-scale objects under a wide field of view; Chinese Journal of Scientific Instrument; vol. 41 No. 4, Apr. 2020.

* cited by examiner

METHOD FOR GENERATING SENSE OF REALITY OF VIRTUAL OBJECT IN TEACHING SCENE

CROSS-REFERENCE TO RELATED APPLICATIONS

This application claims the benefit of priority from Chinese Patent Application No. 202011458753.9, filed on Dec. 11, 2020. The content of the aforementioned application, including any intervening amendments thereto, is incorporated herein by reference in its entirety.

TECHNICAL FIELD

This application relates to mixed reality (MR)-based teaching methods, and more particularly to a method for generating sense of reality of a virtual object in a teaching scene.

BACKGROUND

Virtual reality (VR) technology is one of the three advanced information technologies. As a major branch of the VR technology, mixed reality (MR) employs a device represented by a HoloLens holographic glass to realize the superposition of virtual and real scenes and track a user through various sensors, forming an interactive feedback information loop between the user, learning resource and real environment. An augmented teaching scene based on the MR technology is able to break limitations of using large screens or electronic whiteboards in the existing classroom teaching to effectively improve the learning effect. In addition, the augmented teaching scene has characteristics of good immersion, interactivity and intelligence, such that the learning initiative and subjective initiative of the user can be effectively stimulated, and the teaching environment, content, method and mode will be profoundly changed. The advancement of the 5th-generation (5G) commercialization and the popularization of high-bandwidth and low-latency network environments enable an imaging system built based on the MR and holographic projection technologies to become a display form of the next generation of intelligent teaching environments and have broad application prospects.

Unfortunately, there are still some limitations in generating sense of reality of a virtual object in the augmented teaching scene. For example, the virtual object lacks sufficient understanding of the real environment, such that the user can perceive the teaching environment through a MR device, but the virtual object lacks the corresponding ability. Moreover, the virtual object often penetrates the objects in the teaching space, and the lighting effect and shadow effect are not real, resulting in a lack of the sense of reality. In addition, the interactive settings and guidance methods cannot fully consider feelings of the user, which makes it difficult to position and map in multiple terminals, rendering the interactive experience not realistic enough. The abovementioned shortcomings limit the application of virtual object in the augmented teaching scene.

SUMMARY

An object of this disclosure is to provide a method for generating sense of reality of a virtual object in a teaching scene to overcome the defects in the prior art, which provides a new and complete approach for generating sense of reality of the virtual object in a hybrid-augmented teaching scene to meet requirements of strong interaction for realistic effect of the virtual object in an augmented teaching environment.

Technical solutions of this disclosure are described as follows.

This application provides a method for generating sense of reality of a virtual object in a teaching scene, comprising:

(1) formulating a depth data collection standard of a teaching environment; collecting depth data of a teaching space from multiple trajectories and multiple angles; extracting and generating a three dimensional (3D) model of each object by using a semantic segmentation algorithm; building an octree index structure of the teaching scene to perceive changes of a scene object in a field of view in real time; extracting feature points and lines of the object by using a heuristic algorithm and a cluster analysis method; and optimizing understanding of the teaching scene and the 3D model by using a spatial positioning and real-time mapping technology;

(2) allowing a teacher to place and move the virtual object by a variety of interactive methods; adaptively displaying a position, a posture and a size of the virtual object; collecting a light intensity in the teaching scene to realize a virtual-real fused lighting effect; generating a shadow effect of the virtual object in real time by using ShadowMap; based on a rendering mechanism of Raycasting, determining a position and an occlusion relationship of each object; and occluding a complex area by using a mask plane to simplify determination of the occlusion relationship of each object; and (3) guiding the teacher to use a multi-modal algorithm to complete a real-time interaction with the virtual object by setting interactive prompts of a sight target and a virtual hand; realizing synchronous positioning, mapping and dynamic presentation of an interactive result in multiple terminals; constructing colliders of different objects; according to a collision situation, performing a corresponding operation; and designing a custom Shader to optimize an interactive rendering process.

In an embodiment, the step (1) is performed through steps of:

(1.1) formulating a collection standard of a depth sensor, comprising a collection route and a movement speed; according to requirements of the collection standard, collecting a depth data of each object in the teaching space from multiple trajectories and multiple angles; and describing a position and a posture of each object in a depth synthesis map by using a right-handed coordinate system;

(1.2) according to the depth synthesis map, constructing a surface grid model of the teaching space; extracting and generating the 3D model of each object by using the semantic segmentation algorithm; dividing the teaching scene by using an octree structure to construct an index structure of the teaching scene to realize rapid intersection and collision processing between the objects; and tracking head movement of the teacher and changes of the direction of the sight line of the teacher to perceive parameter changes of the scene objects in the field of view in real time; and (1.3) extracting the feature point of each object in the teaching environment by using the heuristic algorithm; setting the feature point as a spatial anchor point to optimize understanding of the teaching scene and the model; analyzing a surface geometric feature of the model of each object; extracting a feature plane by using the cluster analysis method; and obtaining a 3D surface model of a visible object in the teaching scene in real time by using the spatial positioning and real-time mapping technology;

wherein the step (1.1) is performed through steps of:

(1.1.1) aiming at teaching spaces with different areas and length-width ratios, formulating a collection route and a movement speed of an active-ranging depth sensor; and collecting the depth data of each object in the teaching space from multiple trajectories and multiple angles;

(1.1.2) wearing a time of flight (ToF) sensor on head of the teacher; according to the requirements of the collection standard, scanning the teaching space to quickly collect the depth data of walls, tables, chairs, a blackboard and a platform; and recording a coordinate value of each depth point in meters by using a single-precision floating point number; and (1.1.3) accurately calculating depth maps of the teaching space and its objects collected by multiple sites through an iterative alignment algorithm; splicing the depth maps into a unified coordinate system to generate the depth synthesis map; and describing a position coordinate (x, y, z) and an orientation posture (tx, ty, tz) of each object in the teaching environment by using the right-handed coordinate system;

the step (1.2) is performed through steps of:

(1.2.1) according to the depth synthesis map, constructing the surface grid model of the teaching space; extracting and generating the 3D model of each object by using the semantic segmentation algorithm; creating a cuboid bounding box according to a length, a width, a height, a spatial position, an orientation, and a posture feature of each object; and positioning individual objects by using a YOLO algorithm;

(1.2.2) dividing the teaching scene by using the octree structure and constructing the index structure of the teaching scene; segmenting and preprocessing each object in the teaching scene based on coordinate information of the bounding box of each object; and performing rapid intersection and the collision processing between the objects according to a positional relationship between individual bounding boxes; and (1.2.3) tracking the head movement of the teacher and the changes of the direction of the sight line of the teacher using an acceleration sensor, a gyroscope and a depth perception camera to perceive the scene objects in the field of view in real time; and determining position, posture and size and change of a transformation matrix of the scene object relative to an initial state;

the step (1.3) is performed through steps of:

(1.3.1) extracting the feature point of each object in the teaching environment by using the heuristic algorithm; setting the feature point as the spatial anchor point, wherein the spatial anchor point is taken as a center of a circle and models within 3 meters do not deform with change of a scale of the field of view; and optimizing the understanding of the scene and the model of the teaching space through the spatial anchor point;

(1.3.2) analyzing the surface geometric feature of the model of each object; extracting the feature plane of the model of each object by using the cluster analysis method; and according to changes of the position of the teacher and the direction of the sight line of the teacher, obtaining a visible feature plane in the scene in real time to enhance the understanding of the teaching space; and (1.3.3) positioning a coordinate and a posture of the visible object in the teaching scene by using the spatial positioning and real-time mapping technology; according to the changes of the position of the teacher and the direction of the sight line of the teacher, obtaining the 3D surface model of the visible object in the teaching environment in real time; and eliminating invisible objects to improve a processing speed of understanding the teaching environment.

In an embodiment, the step (2) is performed through steps of:

(2.1) allowing the teacher to place and move the virtual object in the teaching space using interactive methods of voice and gesture; tracking changes of the position, the posture and a zoom ratio of the virtual object by using a perception camera; and adaptively adjusting the position, the posture and the zoom ratio in real time through intersection and collision detection to achieve a realistic display of the virtual object in an augmented teaching scene;

(2.2) collecting a light intensity of a sampling point in the teaching scene; calculating a light intensity of a neighboring point of the sampling point by using a bilinear interpolation algorithm; applying a result to the virtual object to realize the virtual-real fused lighting effect; and generating the realistic shadow effect of the virtual object in real time by using the ShadowMap; and (2.3) determining a positional relationship between the teacher and each object in the augmented teaching scene; based on the rendering mechanism of Raycasting, sorting objects according to a value of a depth buffer; tracking a contour of each object in real time by using a max-flow or min-cut tracking method based on an optical flow method to determine the occlusion relationship; and occluding a three-dimensional (3D) grid of the complex area in the teaching space by translating, stretching, and rotating a simple plane to simplify the determination of the occlusion relationship of each object;

wherein the step (2.1) is performed through steps of:

(2.1.1) based on understanding of a real teaching environment and focus and direction of sight line of the teacher, selecting a positioning point of the virtual object in the teaching space by using the interactive methods of voice and gesture; and placing the virtual object in a corresponding position of the teaching space with an appropriate posture and zoom ratio by comprehensively considering restrictions of a physical rule on the virtual object;

(2.1.2) according to requirements of a teaching task, allowing the teacher to move the virtual object to a wall, a floor, a table, a chair or air in the teaching space through voice, sight, and gesture; and tracking changes of 6 degrees of freedom (DoF) of the virtual object in the teaching environment through the perception camera to obtain a new position, posture and zoom ratio;

(2.1.3) in the augmented teaching scene, allowing the virtual object to follow a physical rule similar to that in a real environment; and when the virtual object is placed or moved, adaptively adjusting the position, the posture and the zoom ratio in real time through intersection and collision detection to realize a virtual-real fused display of the augmented teaching scene;

the step (2.2) is performed through steps of:

(2.2.1) collecting lighting information of a surrounding environment by setting the sampling point in the teaching scene; calculate the light intensity of the neighboring point of the sampling point by using the bilinear interpolation algorithm; and applying interpolation result to the virtual object to realize lighting fusion effect in the augmented teaching scene to render the augmented teaching scene more real and three-dimensional;

(2.2.2) according to a type, quantity and position of a light source in the teaching space, placing a depth virtual camera at the position of the light source to determine a scene object whose bounding box falls within a shadow projection range of the virtual object; and creating a depth texture shadow of a surface model of the scene object using the ShadowMap; and (2.2.3) according to the changes of the position, posture and zoom ratio of the virtual object, updating the shadow projection area of the virtual object in the teaching environment in real time; calculating a shadow slope ratio; and according to setting of a depth offset datum, eliminating shadow aliasing effect to realistically present a real-time dynamic shadow effect;

the step (2.3) is performed through steps of:

(2.3.1) according to the positional relationship between the teacher and each object in the augmented teaching scene, based on the rendering mechanism of Raycasting, determining a distance and position relationship between individual objects and the camera; and constantly calibrating the value of individual objects in the depth buffer and sorting a depth of each object in real time;

(2.3.2) determining a spatial position relationship of individual objects in the augmented teaching scene by using the octree index structure; and accurately tracking the contour of each object in real time from a perspective of the teacher by using the max-flow or min-cut tracking method based on the optical flow method to determine an occlusion relationship and range between virtual and real objects; and (2.3.3) creating some simple planes for displaying white wall areas, complex lighting or impenetrable areas in the teaching space that are difficult to recognize; and occluding a 3D grid structure of the complex areas in the teaching space through translation, rotation and stretching operations to simplify the determination of the occlusion relationship of individual objects in a real space.

In an embodiment, the step (3) is performed through steps of:

(3.1) supporting the teacher to manipulate the virtual object in multiple interactive methods by using the multi-modal algorithm; setting a somatosensory effect of the interactive prompts, wherein the higher the mass is, the lower a somatosensory shift level of the virtual hand is; and guiding the teacher to combine perceived spatial cues with a cognitive structure through the interactive prompts of the sight target and the virtual hand;

(3.2) obtaining a change matrix of the virtual object moved by the teacher and positioning and updating changes of the virtual object at different terminals; mapping a transformed virtual object to a localized teaching environment of different terminals and synchronously mapping an interactive result by using simultaneous localization and mapping (SLAM) technology; and updating the lighting effect and the shadow effect to realize a realistic experience of the virtual object in the teaching environment; and (3.3) constructing different colliders according to a shape of the surface grid model of each object; calculating next position of the virtual object by using a scanline algorithm to determine whether the virtual object collides with other objects, thereby performing a corresponding operation; designing the custom Shader; rendering a texture pixel by using a fragment shader; and reconstructing a vertex rendering process;

the step (3.1) is performed through steps of:

(3.1.1) constructing a multi-modal interactive fusion algorithm for vision, hearing and touch in a holographic imaging environment to support the teacher to push, pull, shake and move the virtual object in the augmented teaching scene through interactive operations of gesture, sight line and head movement, so as to enhance reality of the interactive operations in a teaching process;

(3.1.2) estimating a volume, density and mass of the virtual object according to properties of the virtual object; and setting the somatosensory effect of the interactive prompts based on a physical law of gravity, wherein the greater the mass is, the lower the somatosensory shift level of the virtual hand is, such that illusion of offset is weaker to enhance realistic experience of the teacher; and (3.1.3) guiding the teacher to combine the perceived spatial cues with the cognitive structure in the augmented teaching scene through the interactive prompts of the sight target and the virtual hand to enhance natural transition from a real teaching scene to a virtual environment, form a matching spatial situation model and enhance perceptual experience of the teacher;

the step (3.2) is performed through steps of:

(3.2.1) allowing the teacher to move the virtual object in the augmented teaching scene under the guidance of the virtual hand and the sight target according to requirements of a teaching activity; and calculating a transformation matrix of position, posture and scale before and after movement to position and update changes of the virtual object at different terminals;

(3.2.2) according to requirements of the teacher and a student to share the augmented teaching scene, mapping a transformation parameter of the virtual object to the localized teaching environment of a student terminal by using the SLAM technology, so as to realize consistent mapping on different terminals and relative position mapping with other scene objects; and (3.2.3) allowing the teacher to manipulate the virtual object by using a multi-modal interaction mode to present a new position, posture and zoom ratio of the virtual object in an augmented teaching environment by using a holographic imaging system; and according to a relative relationship with the light source, updating the lighting effect and the shadow effect to make the virtual object in the teaching environment produce a realistic experience effect; and the step (3.3) is performed through steps of:

(3.3.1) constructing different colliders according to the shape of the surface grid model of each object in the augmented teaching scene; and quickly detecting collision between the virtual object and other objects by using an Opcode method;

(3.3.2) allowing the teacher to move, rotate and scale the virtual object in the augmented teaching scene through the interactive methods of gesture and sight line; calculating the next position, posture and proportion of the virtual object by using the scanline algorithm to determine whether the virtual object collides with other objects; and if the virtual object collides with other objects, stopping moving the virtual object or performing an obstacle avoidance operation; and (3.3.3) in an interactive process of the augmented teaching scene, designing the custom shader by comprehensively considering a bandwidth, a cache behavior and a filtering indicator in a rendering pipeline; rendering the texture pixel by using the fragment shader; and reconstructing a vertex rendering process to meet requirements for real-time dynamic update of light, shadow and animation.

Compared to the prior art, this disclosure has the following beneficial effects.

With respect to the method for generating sense of reality of a virtual object in a teaching scene, a depth data collection standard for a teaching space is formulated, and a 3D model of each object is generated by using a semantic segmentation algorithm. Changes of scene objects in a field of view are perceived in real time and understanding of a teaching scene and the 3D model is optimized. When the object is placed and moved in a real teaching scene, it can realize a virtual-real fused lighting effect and shadow effect, and a complex area is occluded by using a mask plane to simplify determination of an occlusion relationship of each object. The teacher is guided to complete a real-time interaction with the virtual object by setting interactive prompts of a sight target and a virtual hand. An interactive result is synchronous positioned, mapped and dynamically presented in multiple terminals. A custom Shader is designed to optimize an interactive rendering process. The increasing maturity of 5th-generation (5G), mixed reality (MR) and holographic imaging technologies brings high requirements for the generation and display of sense of reality of the virtual object. This application is beneficial to meeting the requirements of strong interaction for realistic effect of the virtual object in an augmented teaching environment.

DETAILED DESCRIPTION OF EMBODIMENTS

The present disclosure will be further described in detail with reference to the embodiments and the accompanying drawings to make objects, technical solutions and advantages of the present disclosure better understood. It should be understood that the embodiments presented in the accompanying drawings are merely illustrative of the disclosure, and are not intended to limit the present disclosure. In addition, technical features in the following embodiments can be combined with each other as long as they do not conflict with each other.

Figure 1:
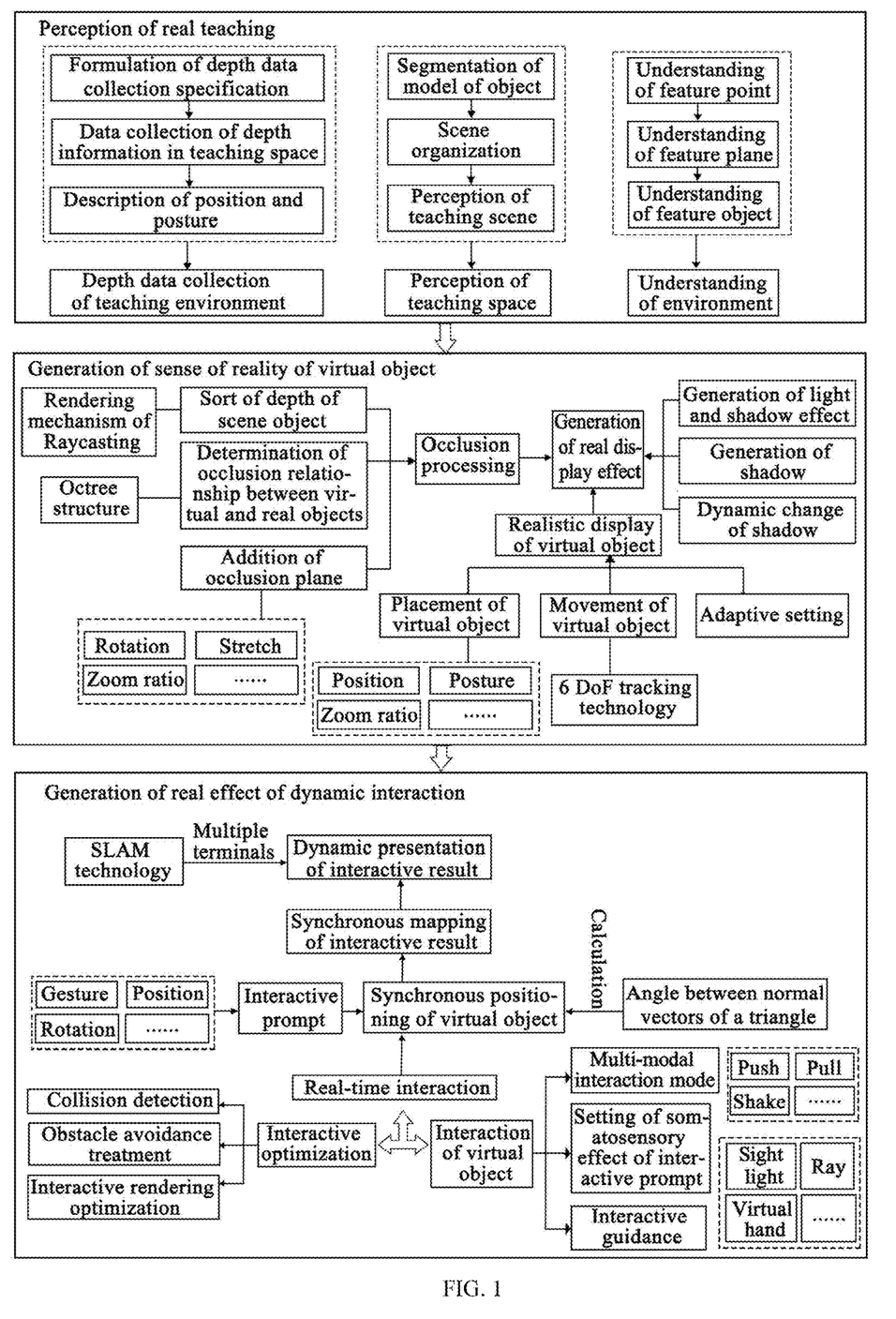
FIG. 1 is a flow chart of a method for generating sense of reality of a virtual object in a teaching scene according to an embodiment of the present disclosure.
Figure 2:
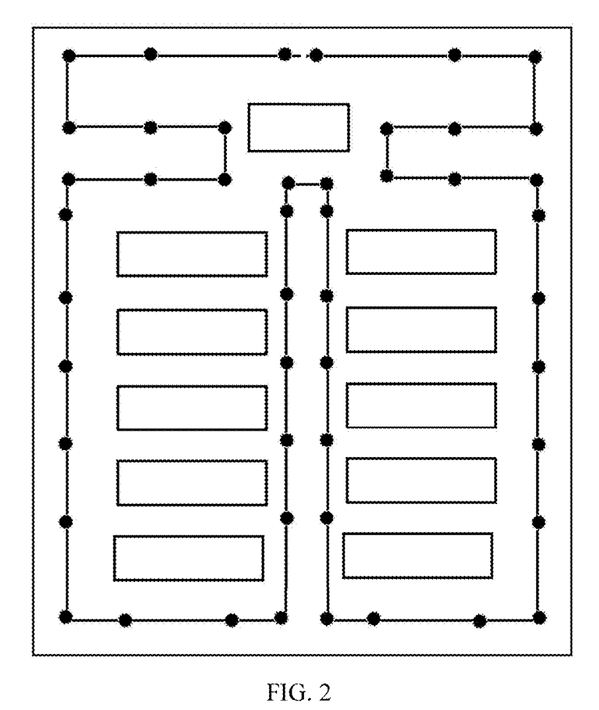
FIG. 2 schematically shows a depth data collection route and point location in a teaching space according to an embodiment of the present disclosure.

As shown in FIG. 1, this application provides a method for generating sense of reality of a virtual object in a teaching scene.

(1) Perception of Teaching Space

A collection standard of a depth sensor is formulated. Depth information of a teaching space is collected from multiple angles. A three dimensional (3D) model of each object is generated by using a semantic segmentation algorithm. An octree index structure of the teaching scene is built to perceive changes of each object in teaching space. Feature points of the objects are extracted by using a heuristic algorithm. Understanding of the teaching scene and the 3D model is optimized by setting a spatial anchor point.

(1.1) Depth Data Collection of Teaching Environment

A collection standard of the depth sensor is formulated, including a collection route and a movement speed. According to requirements of the collection standard, depth data of each object in the teaching space are collected from multiple trajectories and multiple angles. A position and a posture of each object are described in a depth synthesis map by using a right-handed coordinate system.

(1.1.1) Formulation of Depth Data Collection Standard in Teaching Space

Aiming at teaching spaces with different areas and length-width ratios, the collection route and the movement speed of an active-ranging depth sensor are formulated. The depth data of each object in the teaching space are collected from multiple trajectories and multiple angles.

(1.1.2) Data Collection of Depth Information in Teaching Space

A time of flight (ToF) sensor is worn on head of the teacher. According to the requirements of the collection standard and layout of walls, tables, chairs, a blackboard and a lectern in the teaching space, the collection route, a collection position and the movement speed of the depth data in the teaching space are set to obtain the depth data of the teaching space. A coordinate value of each depth point is recorded in meters by using a single-precision floating point number.

(1.1.3) Description of Position and Posture

Figure 3:
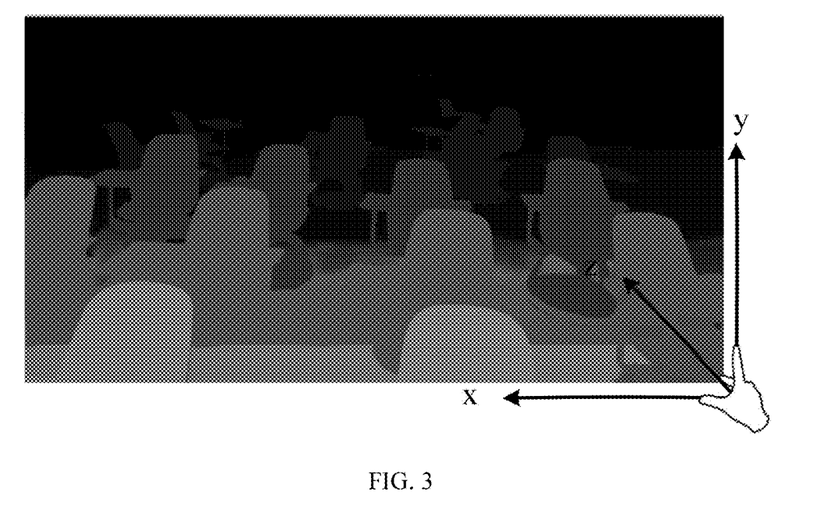
FIG. 3 is a synthesis map of depth data of a multi-site teaching space according to an embodiment of the present disclosure.

Depth maps of the teaching space and its objects collected by multiple sites are accurately calculated and synthesize, which are shown in FIG. 3. The depth maps are spliced into a unified coordinate system to generate the depth synthesis map. A position coordinate (x, y, z) and an orientation posture (tx, ty, tz) of each object (walls, tables, chairs, blackboard and lectern) in the teaching environment are described by using the right-handed coordinate system.

(1.2) Perception of Teaching Space

Figure 4:
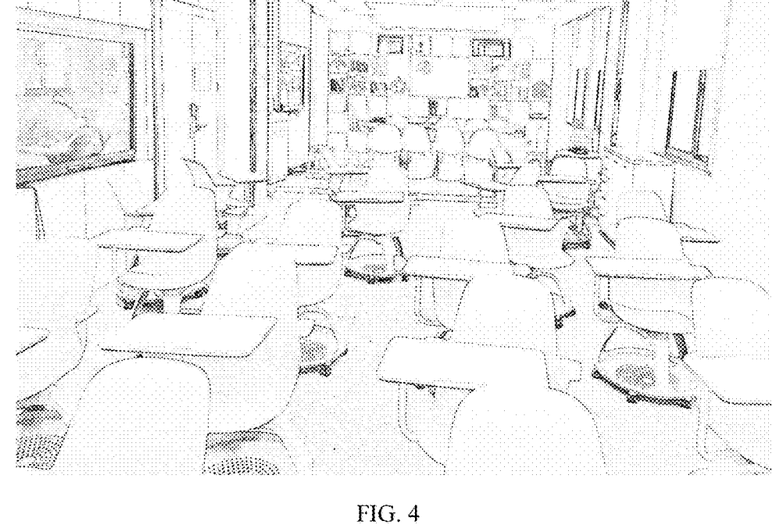
FIG. 4 schematically shows segmentation of a three-dimensional (3D) model of the teaching space according to an embodiment of the present disclosure.

According to the depth synthesis map, a surface grid model of the teaching space is constructed. The 3D model of each object is extracted and generated by using the semantic segmentation algorithm, which is shown in FIG. 4. The teaching scene is divided by using an octree structure to construct an index structure of the scene to realize rapid intersection and collision processing between the objects. Head movement of the teacher and changes of the direction of the sight line of the teacher are tracked to perceive parameter changes of the scene objects in the field of view in real time.

(1.2.1) Segmentation of Model of Object

According to the depth synthesis map, the surface grid model of the teaching space is constructed. The 3D model of each object is extracted and generated by using the semantic segmentation algorithm.

A 4-level neural convolutional network is designed to extract the depth information. Data of each object in the depth data are segmented by using a directional depth histogram operator.

Figure 5:
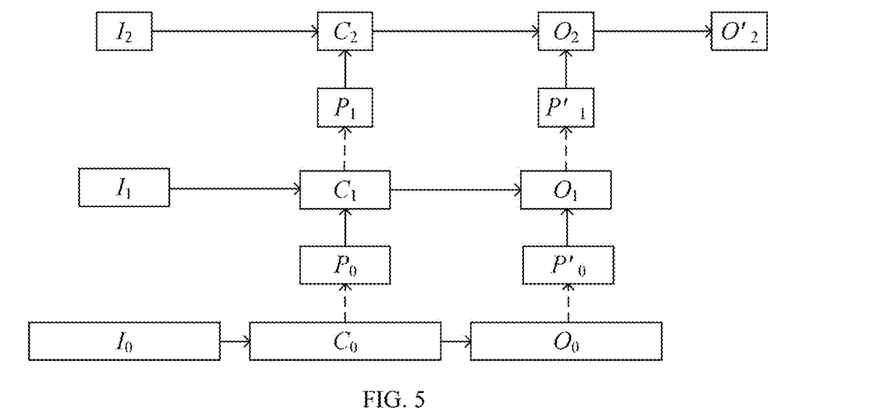
FIG. 5 is a schematic diagram of a 4-layer convolutional neural network according to an embodiment of the present disclosure.

As shown in FIG. 5, first 3 levels s={0,1,2} respectively correspond to input, hidden convolution and output of the depth map (i.e., $I_S$, $C_S$, and $O_S$). Convergence layers $P_S$ and $P'_S$ between the levels are configured to reduce resolution hierarchy of the depth map. An output layer $O'_S$ is the fourth level. Training results of the previous level are used for the content extraction of the next level by using a layer-based intelligent supervision training method. A low-resolution level provides a priori knowledge for a high-resolution level, and real-time sampling can allows information from a larger receptive domain to be used in the final decision.

A gradient direction and a size of a pixel P are respectively defined as $\alpha_p$ and $n_p$. According to quantization values $|\alpha_p|$ and $n_p$ of 8 neighborhoods, a histogram of the directional intensity of each depth point is generated, and then a Gaussian Blur filter is configured to quantify the entire depth map, and then the histogram is normalized using a L2-hys paradigm. All depth maps are normalized to zero mean and unit variables, and the process is repeatedly applied to each level. A sample map and a segmentation effect of the object are shown in FIG. 4.

According to a length, a width, a height, a spatial position, an orientation, and a posture feature of each object, an outer bounding box of the smallest cuboid is obtained to create a cuboid bounding box for each object. Individual objects are positioned by using a YOLO algorithm.

(1.2.2) Scene Organization

Figure 6:
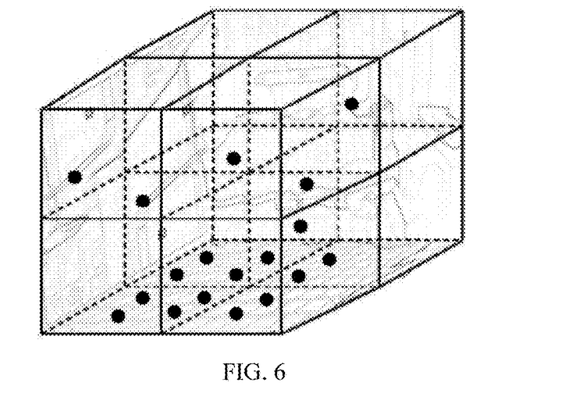
FIG. 6 is a schematic diagram of a segmentation scene of an octree structure according to an embodiment of the present disclosure.

As shown in FIG. 6, according to a distribution range of each object in the teaching space, a boundary cube of a scene model is subdivided by using a breadth-first algorithm. The objects in the teaching scene are subdivided and iterated by using the octree structure to construct the index structure of the teaching scene. Through a pooling operation, an octet with a depth of d is connected to a sub-octet with a depth of d+1 after down-sampling calculation, which is configured to specify a label of a non-empty octet and store a label vector. An index j is defined at a non-empty node of the $d^{th}$ depth, and an index $k=8*(L_{d[j]}-1)$ of a first sub-octet is calculated at the $d+1^{th}$ depth. The index structure of the scene based on posture information of each object, and each object in the teaching scene is segmented and preprocessed. The rapid intersection and the collision processing between the objects are performing according to a positional relationship (inclusion and intersection) between individual bounding boxes.

(1.2.3) Perception of Teaching Scene

The head movement of the teacher and the changes of the direction of the sight line of the teacher are tracked by using ellipse fitting for pupil positioning in combination with an acceleration sensor, a gyroscope and a depth perception camera, so as to realize robust calibration between eye-movement data and a gaze point on a reference plane, establish a spatial mapping model in the case of the head movement, and perceive the scene objects in the field of view in real time. Position, posture and size of the scene objects and change of a transformation matrix relative to an initial state are determined.

(1.3) Understanding of Environment

The feature point of each object in the teaching environment is extracted by using the heuristic algorithm. The feature point is set as a spatial anchor point to optimize understanding of the teaching scene and the model. A surface geometric feature of the model of each object is analyzed. A feature plane is extracted by using the cluster analysis method. A 3D surface model of a visible object in the teaching scene is obtained in real time by using the spatial positioning and real-time mapping technology.

(1.3.1) Understanding of Feature Point

A vertex of the external bounding box of each object, such as corner points of the wall, tables, chairs, lecterns, blackboards, in the teaching environment is extracted by using the heuristic algorithm. The vertex of the external bounding box of each object is set as the spatial anchor point, where the spatial anchor point is taken as a center of a circle. A spatial distance from the center to the spatial anchor point of other objects is calculated. If the distance is less than 3 meters, a display effect of the object's model remains unchanged. The understanding of the scene and the model of the teaching space is optimized through the spatial anchor point.

(1.3.2) Understanding of Feature Plane

The surface geometric feature of model of each object, such as walls, tables and chairs, blackboards, and lecterns, is analyzed. Distribution of the feature plane in each object is determined by using the cluster analysis method. A euclidean distance is selected as a similarity index, and the clustering sum of squares of k points is used to minimize the index:

$$J = \sum_{k=1}^{k} \sum_{i=1}^{n} \|x_i - u_k\|^2;$$

$$u_k = \frac{\sum_{i=1}^{n} r_{ik} x_i}{\sum_{i=1}^{n} r_{ik}};$$

where $u_k$ is a new central point, that is a center of mass, xi is an initial cluster center of each object, and $$r_{ik} = \begin{cases} 1 \text{ if } x_n \in k \\ 0 \text{ else} \end{cases}.$$

The cluster center of the feature plane is extract. The feature plane is fit by using a spatial mapping method and a boundary of each plane is extracted by using a convex hull algorithm. According to changes of the position of the teacher and the direction of the sight line of the teacher, the range of the visible field of view is updated to obtain a visible feature plane in the scene in real time, so as to enhance the understanding of the teaching space.

(1.3.3) Understanding of Feature Object

A coordinate and a posture of the visible object in the teaching scene are positioned by using the spatial positioning and real-time mapping technology. According to the changes of the position of the teacher and the direction of the sight line of the teacher, the 3D surface model of the visible object in the teaching environment is obtained in real time. Invisible objects are eliminated to improve a processing speed of understanding the teaching environment.

(2) Generation of Sense of Reality of Virtual Object

A teacher places and moves the virtual object by a variety of interactive methods and a position, a posture and a size of the virtual object are adaptively displayed. A light intensity is collected in the teaching scene to realize a virtual-real fused lighting effect. A shadow effect of the virtual object is generated in real time by using a ShadowMap. Based on a rendering mechanism of Raycasting, a position and an occlusion relationship of each object are determined. A complex area is occluded by using a mask plane to simplify determination of the occlusion relationship of each object.

(2.1) Realistic Display of Virtual Object

The teacher places and moves the virtual object in the teaching space using the interactive methods of voice and gesture. Changes of the position, the posture and a zoom ratio of the virtual object are tracked by using a perception camera. The position, the posture and the zoom ratio are adaptively adjusted in real time through intersection and collision detection to achieve a realistic display of the virtual object in an augmented teaching scene.

(2.1.1) Placement of Virtual Object

Based on understanding of a real teaching environment and focus and direction of sight line of the teacher, a positioning point of the virtual object is selected in the teaching space by using the interactive methods of voice and gesture. The virtual object is placed in a corresponding position of the teaching space with an appropriate posture and zoom ratio by considering rigid body attributes added by a physical rule for each virtual object and constraints (friction, elasticity, air resistance and gravity) set on the surface of other objects.

(2.1.2) Movement of Virtual Object

According to requirements of a teaching task, the teacher moves the virtual object to a wall, a floor, a table, a chair or air in the teaching space through voice, sight, and gesture. Changes of 6 degrees of freedom (DoF) of the virtual object are tracked in the teaching environment to obtain a new position, posture and zoom ratio.

(2.1.3) Adaptive Setting

In the augmented teaching scene, the virtual object follows a physical rule similar to that in a real environment, such as a foreshortening effect. When the virtual object is placed or moved, a control function is used through intersection and collision detection. The control function is expressed as follow:

$$u(k) = u(k-1) + \frac{\beta \phi_c(k)}{\lambda + |\phi_c(k)|^2}(y^*(k+1) - y(k));$$

where $u(k) \in R$, $v(k) \in R$ respectively represents input and output of data at time k; $\lambda$ is a weight factor; $\rho$ is a step factor and is configured to limit the amount of variation that controls the input to the virtual object; $\phi_c(k) \in R$ is a time-varying parameter; and $y'(k+1)$ is an expected output result. The position, the posture and the zoom ratio are adaptively adjusted in real time to realize a virtual-real fused display of the augmented teaching scene.

(2.2) Generation of Real Display Effect

A light intensity of a neighboring point is calculated by using a bilinear interpolation algorithm by collecting a light intensity of a sampling point in the teaching scene. A result is applied to the virtual object to realize the virtual-real fused lighting effect. The realistic shadow effect of the virtual object is generated in real time by using the ShadowMap.

(2.2.1) Generation of Light and Shadow Effect

Lighting information of a surrounding environment is collected by setting the sampling point in the teaching scene. Based on a reflection situation of a spatial position x and an incident light $w_i$, relationships between the incident light and a reflected light w in different directions are calculated by using a bidirectional reflection distribution function (BRDF) $f_r(x, w_i \leftrightarrow w)$ and a reflection model. The reflection model is expressed as follow:

$$I = k_a I_a + k_d(n \cdot l) I_d + k_s(r \cdot v)^\alpha I_s;$$

where a is an ambient light; d is a reflected light; s is a highlight; k is a reflection coefficient or material color; I is a color or brightness of the light; and $\alpha$ is surface roughness of an object.

The range and sharpness of a light area are controlled according to the change of the relationship between the incident light and the reflected light. An increased lighting value is calculated according to the distance. The virtual object is illuminated by using an indirect light effect of the sampling point in the scene. When the coordinate of the target image is set to a single-precision floating-point number, there is a non-integer remapping, and a source image is corresponding through a side ratio. The light intensity of the neighboring point of the sampling point is calculated by using the bilinear interpolation algorithm. Interpolation result is applied to the virtual object to realize lighting fusion effect in the augmented teaching scene to render the augmented teaching scene more real and three-dimensional.

(2.2.2) Generation of Shadow

Figure 7:
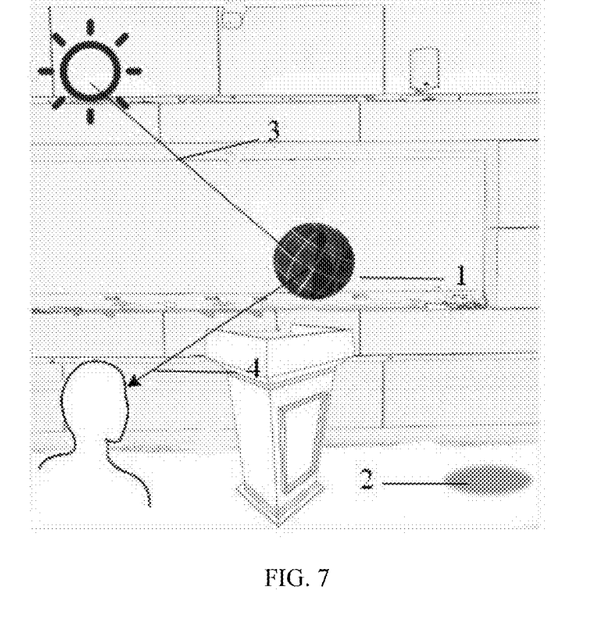
FIG. 7 shows generation effect of a depth texture shadow according to an embodiment of the present disclosure, where position 1: a virtual object; position 2: a shadow of the virtual object; position 3: an incident light; and position 4: a reflected light.

According to a type, quantity and position of a light source in the teaching space, a depth virtual camera is placed at the position of the light source and a frustum range of the depth virtual camera is set. The entire teaching scene is rendered from a perspective of the light source to obtain a shadow effect of the scene. According to the coordinate of the vertex of the external bounding box of each object, a scene object whose bounding box falls within a shadow projection range of the virtual object is determined. The texture shadow data is traversed and copied from the depth buffer, and an associated depth texture shadow is generated on the feature plane, which is shown in FIG. 7.

(2.2.3) Dynamic Change of Shadow

According to the changes of the position, posture and zoom ratio of the virtual object, the shadow projection area of the virtual object in the teaching environment is updated in real time by using a principle of a lighting model and a ShadowMap algorithm. A shadow slope scale is calculated by using an inverse trigonometric function. The inverse trigonometric function is expressed as follow:

$$\tan \alpha(\text{slope}) = \text{difference of elevation/horizontal distance}.$$

According to setting of a depth offset datum, shadow aliasing effect is eliminated. The direction and intensity of the light source are obtained in combination with a light source detection algorithm. The light source detection algorithm is expressed as follow:

$$L(x,w) = L_e(x,w) + L_r(x,w);$$

$$L_r(x,w) = \int_\Omega L_i(x,w_i) f_r(x, w_i \leftrightarrow w) <n_x, w_i> dw_i$$

The dynamic change of the shadow of the virtual object under the superimposed effect of direct and indirect lighting is adjusted compared to the brightness of the surrounding environment and the surface of the virtual object. $L_e(x,w)$ represents the an irradiance rate of the direct lighting;

$L_r(x,w)$ represents an irradiance rate of the indirect lighting; and $L(x,w)$ represents an irradiance rate along a direction w at a spatial position x.

Figure 8:
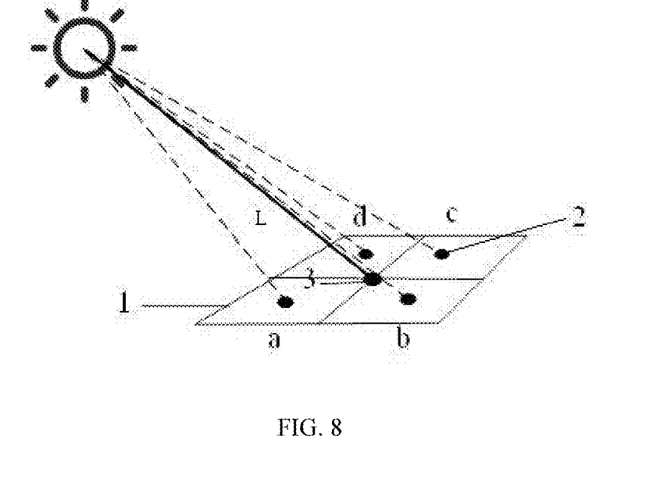
FIG. 8 is a schematic diagram of dynamic processing of shadow offset according to an embodiment of the present disclosure, where position 1: a shadow distortion plane; position 2: a pixel point; position 3: a center point; and L: a distance from a light source to the center point

As shown in FIG. 8, a plane that produces shadow offset is sampled. A distance from four pixels a, b, c and d to the light source is respectively compared with a distance from the center point to the light source to determine the light and shade of each pixel.

(2.3) Occlusion Processing

A positional relationship between the teacher and each object is determined in the augmented teaching scene. Based on the rendering mechanism of Raycasting, objects are sorted according to a value of a depth buffer. A contour of each object is tracked in real time by using a max-flow or min-cut tracking method based on an optical flow method to determine the occlusion relationship. A three-dimensional (3D) grid of the complex area in the teaching space is occluded by translating, stretching, and rotating a simple plane to simplify the determination of the occlusion relationship of each object.

(2.3.1) Sort of Depth of Scene Object

According to the positional relationship between the teacher and each object in the augmented teaching scene, a physical contour of foreground of each object is obtained based on the rendering mechanism of Raycasting. A distance and position relationship between individual objects and the camera are determined. The depth information of each object in the teaching scene is sorted through a depth value gradient distribution method. The value of individual objects in the depth buffer is constantly calibrated. A depth of each object is sorted in real time.

(2.3.2) Determination of Occlusion Relationship Between Virtual and Real Objects A spatial position relationship of individual objects in the augmented teaching scene is determined by using the octree structure. The depth values of a foreground object and the virtual object are compared to determine the occlusion relationship. First, the feature points in the target area in the previous frame of image are tracked by using the optical flow method. An edge $e \in E$ of the bounding box is connected to two adjacent feature points. A non-negative weight $w_e$ is set for each edge. Contour tracking of maximum flow/minimum cut is performed by using an expression:

$$c = \min\left(\lambda \cdot \sum_{e \in E} w_e\right).$$

Figure 9:
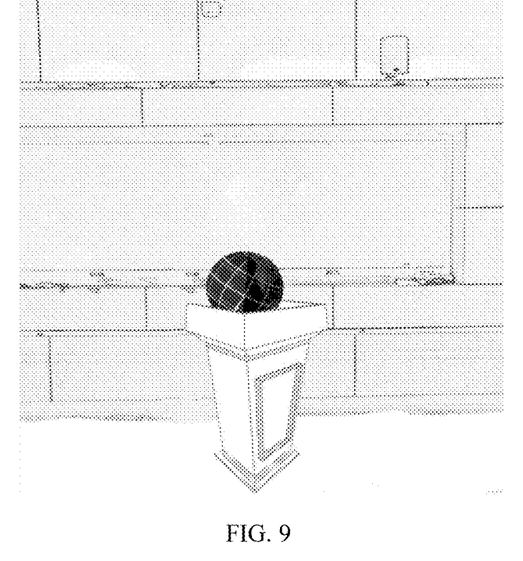
FIG. 9 shows an occlusion relationship between the virtual object and a real object according to an embodiment of the present disclosure.

According to the displacement of the feature point, the contour of the previous frame is translated to obtain the approximate contour of the current target object. The precise contour of the target is obtained with a band-shaped area centered on the approximate contour, and the band-shaped area is quickly converged to the target boundary. The max-flow or min-cut tracking method based on the optical flow method is adopted, and the gradient calculation formula of the depth image is used and expressed as follow:

$$DGoD_{p(x,y)} = \tan^{-1}\frac{dy}{dx} = \tan^{-1}\frac{p(x, y+1) - p(x, y-1)}{p(x+1, y) - p(x-1, y)};$$

where P(x,y) represents the position of an object in the space. The contour of each object is accurately tracked in real time from a perspective of the teacher. The depth value of the foreground object is compared with that of the virtual object to determine the occlusion relationship and range between virtual and real objects as shown in FIG. 9.

(2.3.3) Addition of Occlusion Plane

Figure 10:
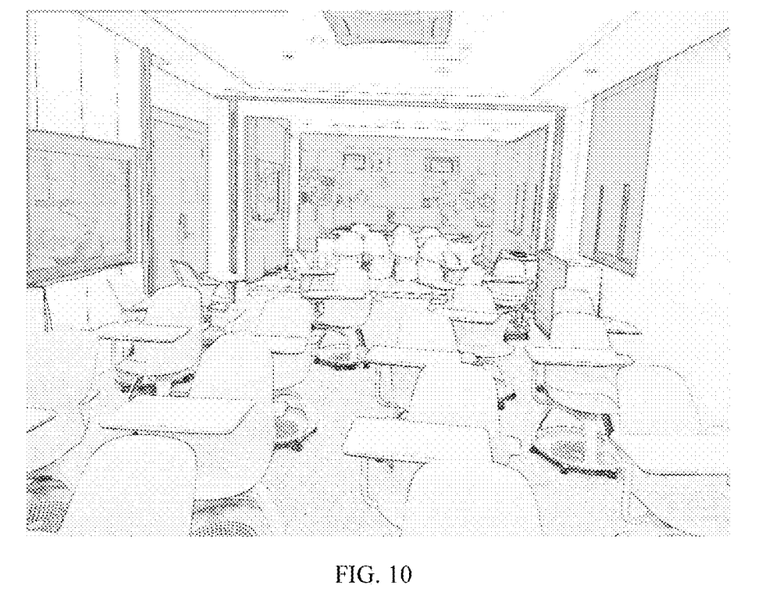
FIG. 10 schematically shows occlusion of a 3D grid in a complex teaching space according to an embodiment of the present disclosure.

Some simple planes (quadrilaterals) are created for displaying white wall areas, complex lighting or impenetrable areas in the teaching space that are difficult to recognize. As shown in FIG. 10, a 3D grid structure of the complex areas in the teaching space is occluded through translation, rotation and stretching operations to simplify the determination of the occlusion relationship of individual objects in a real space.

(3) Generation of Real Effect of Dynamic Interaction

The teacher is guided to use a multi-modal algorithm to complete a real-time interaction with the virtual object by setting interactive prompts of a sight target and a virtual hand. Synchronous positioning, mapping and dynamic presentation of an interactive result are realized in multiple terminals. Colliders of different objects are constructed. According to a collision situation, a corresponding operation is performed and a custom Shader is designed to optimize an interactive rendering process.

(3.1) Interaction of Virtual Object

The teacher is supported to manipulate the virtual object in multiple interactive methods by using the multi-modal algorithm. A somatosensory effect of the interactive prompts is set, where the higher the mass is, the lower a somatosensory shift level of the virtual hand is. The teacher is guided to combine perceived spatial cues with a cognitive structure through the interactive prompts of the sight target and the virtual hand.

(3.1.1) Multi-Modal Interaction Mode

A multi-modal interactive fusion algorithm for vision, hearing and touch is constructed in a holographic imaging environment to obtain the bounding box of the virtual object and support the teacher to push, pull, shake and move the virtual object in the augmented teaching scene through interactive operations of gesture, sight line and head movement, so as to enhance reality of the interactive operations in a teaching process.

(3.1.2) Setting of Somatosensory Effect of Interactive Prompt

A volume, density and mass of the virtual object are estimated according to properties of the virtual object. Based on a physical law of gravity for different physical load levels, the somatosensory shift level of the virtual interactive prompt is classified. The greater the mass is, the lower the somatosensory shift level of the virtual hand is, such that illusion of offset is weaker to enhance realistic experience of the teacher.

(3.1.3) Interactive Guidance

Spatial cognition of representation of the augmented teaching scene is established. The teacher is guided to combine the perceived spatial cues with the cognitive structure in the augmented teaching scene through the interactive prompts of the sight target and the virtual hand. According to a movement state, a current position coordinate and a scene presentation angle of the virtual object, the teaching scene is rendered in accordance with the perspective of teachers and students to improve teachers and students' sense of self-positioning and subjective behavior, enhance natural transition from a real teaching scene to a virtual environment, form a matching spatial situation model and enhance perceptual experience of the teacher.

(3.2) Real-Time Interaction

A change matrix of the virtual object moved by the teacher is obtained and changes of the virtual object are positioned and updated at different terminals. A transformed virtual object is mapped to a localized teaching environment of different terminals and an interactive result is synchronously mapped by using simultaneous localization and mapping (SLAM) technology. The lighting effect and the shadow effect are updated to realize a realistic experience of the virtual object in the teaching environment.

(3.2.1) Synchronous Positioning of Virtual Object

An angle between the teacher's sight and the surface normal vector of the virtual object is calculated under the guidance of the virtual hand and the sight target. According to requirements of a teaching activity, the teacher clicks, moves, rotates and zooms the virtual object in the augmented teaching scene. A transformation matrix of position, posture and scale before and after movement is calculated to position and update changes of the virtual object at different terminals.

(3.2.2) Synchronous Mapping of Interactive Result

According to requirements of the teacher and a student to share the augmented teaching scene, the feature point of each object is extracted and matched by using the visual SLAM technology. Changes of position and posture are inverted to obtain accurate position and posture estimation. Teaching scene data of different devices for multiple users are synchronized to obtain consistent mapping of environment and devices and the relative position mapping of group of key frames. A transformation parameter of the virtual object is mapped to the localized teaching environment of a student terminal by using the SLAM technology, so as to realize consistent mapping on different terminals and relative position mapping with other scene objects.

(3.2.3) Dynamic Presentation of Interactive Result

The teacher manipulates the virtual object by using a multi-modal interaction mode to present a new position, posture and zoom ratio of the virtual object in an augmented teaching environment by using a holographic imaging system. According to a relative relationship with the light source, the lighting effect and the shadow effect are updated to make the virtual object in the teaching environment produce a realistic experience effect.

(3.3) Interactive Optimization

Different colliders are constructed according to a shape of the surface grid model of each object. Next position of the virtual object is calculated by using a scan line algorithm to determine whether the virtual object collides with other objects, thereby performing the corresponding operation. The custom shader is designed. A texture pixel is rendered by using a fragment shader. A vertex rendering process is reconstructed.

(3.3.1) Collision Detection

Figure 11:
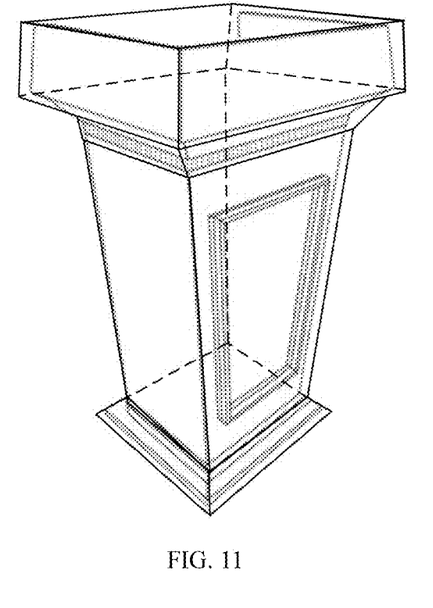
FIG. 11 schematically shows creation of an irregular collider according to an embodiment of the present disclosure.

Different colliders are constructed according to a shape of the surface grid model of each object in the augmented teaching scene. When the surface grid model of an object is a regular rectangular parallelepiped shape, an external rectangular box is constructed. For an irregular surface shown in FIG. 11, a rectangular box represented by segments is used to close the surface of the object. A sampling detection pair p(Ai,Bi) of the target is detected by using an Opcode method. A marker matrix of the initial position X is expressed as follow:

$$X = \begin{bmatrix} X_{Ai} \\ X_{Bi} \end{bmatrix} = \begin{bmatrix} A_{ix} & A_{iy} & A_{iz} \\ B_{jx} & B_{jy} & B_{jz} \end{bmatrix};$$

where $X_{Ai}$ and $X_{Bi}$ represent the point position coordinates of the collider. A euclidean distance $f(p(A_i,B_j))$ between two target features in the 3D space is used as a judgment basis to quickly detect collision between the virtual object and other objects.

(3.3.2) Obstacle Avoidance Treatment

The teacher moves, rotates and scales the virtual object in the augmented teaching scene through the interactive methods of gesture and sight line. The equations of each side are calculated by using the scan line algorithm and are expressed as follow:

$$\begin{cases} ax_i + by_i + c = 0 \\ ax_{i+1} + by_{i+1} + c = 0 \end{cases}.$$

It is supposed that a constant Δx represents the step length relationship. Intersection points of the scan line and the virtual object is calculated. The intersection points are sorted according to the distance from small to large to determine whether the virtual object collides with other objects. A movement path that does not collide with other objects and meets the kinematic constraints of the virtual object is planned. If the collision happens, the movement is stopped or a coordinated control motion equation is used to perform an obstacle avoidance operation. The coordinated control motion equation is expressed as follow:

$$\begin{cases} f(\rho, \psi_\omega, \Phi) = \dfrac{\rho g \tan \Phi}{V \tan(\psi + \eta - \psi_\omega)} \\ g(\psi_\omega) = \dfrac{V \sin \eta}{\tan(\psi + \eta - \psi_\omega)} - V \cos \eta \end{cases};$$

where $\psi_\omega$ is an azimuth angle from the current position to the obstacle; v, ψ, Φ, g is respectively a movement speed, a deflection angle, an apparent rotation angle and a gravitational acceleration; and p is a distance from the camera to the obstacle.

(3.3.3) Interactive Rendering Optimization

In an interactive process of the augmented teaching scene, the custom shader is designed by comprehensively considering a bandwidth, a cache behavior and a filtering indicator in a rendering pipeline. The fragment shader that meets the requirements of the visual effect is used to remove attributes that can be omitted, such as secondary maps in the material and reduce the complexity of the vertex shader code. A texture compression method is used to reduce the texture size of each object in the classroom space, thereby optimizing the existing bandwidth. A vertex rendering process is reconstructed to meet requirements for real-time dynamic update of light, shadow and animation.

The partial content is not described in detail in this application, which is known to those skilled in the prior art.

Described above are only preferred embodiments of this application, and are not intended to limit this application. Any modification, replacement and improvement made by those skilled in the art without departing from the spirit and principle of this application shall fall within the scope of this application.

What is claimed is:

1. A method for generating sense of reality of a virtual object in a teaching space, comprising:
   (1) formulating a depth data collection standard of a teaching environment; collecting depth data of the teaching space from multiple trajectories and multiple angles; extracting and generating a three dimensional (3D) model of each virtual object by using a semantic segmentation algorithm; building an octree index structure of the teaching space to perceive changes of virtual objects in a field of view in real time; extracting feature points and lines of the virtual objects by using a heuristic algorithm and a cluster analysis method; and optimizing understanding of the teaching space and the 3D model of each virtual object by using a spatial positioning and real-time mapping technology;

(2) allowing a teacher to place and move the virtual objects by a variety of interactive methods; adaptively displaying a position, a posture and a size of the virtual objects; collecting a light intensity in the teaching space to realize a virtual-real fused lighting effect; generating a shadow effect of the virtual objects in real time by using ShadowMap; based on a rendering mechanism of Raycasting, determining a position and an occlusion relationship of the virtual objects in the teaching space; and occluding a complex area by using a mask plane to simplify determination of the occlusion relationship of each virtual object; and (3) guiding the teacher to use a multi-modal algorithm to complete a real-time interaction with the virtual objects by setting interactive prompts of a sight target and a virtual hand; realizing synchronous positioning, mapping and dynamic presentation of an interactive result in multiple terminals; constructing colliders of different virtual objects; according to a collision situation, performing a corresponding operation; and designing a custom Shader to optimize an interactive rendering process;

wherein the step (2) is performed through steps of:

(2.1) allowing the teacher to place and move the virtual objects in the teaching space using interactive methods of voice and gesture; tracking changes of the position, the posture and a zoom ratio of the virtual objects by using a perception camera; and adaptively adjusting the position, the posture and the zoom ratio in real time through intersection and collision detection to achieve a realistic display of the virtual objects in an augmented teaching scene;

(2.2) collecting a light intensity of a sampling point in the teaching space; calculating a light intensity of a neighboring point of the sampling point by using a bilinear interpolation algorithm; applying the light intensity the sampling point and the light intensity of the neighboring point of the sampling point to the virtual objects to realize the virtual-real fused lighting effect; and generating a realistic shadow effect of the virtual objects in real time by using the ShadowMap; and (2.3) determining a positional relationship between the teacher and each virtual object in the augmented teaching scene; based on the rendering mechanism of Raycasting, sorting the virtual objects according to their depth values in a depth buffer; tracking a contour of each virtual object in real time by using a max-flow or min-cut tracking method based on an optical flow method to determine the occlusion relationship; and occluding a three-dimensional (3D) grid of the complex area in the teaching space by translating, stretching, and rotating a simple plane to simplify the determination of the occlusion relationship of each virtual object;

the step (2.1) is performed through steps of:

(2.1.1) based on understanding of a real teaching environment and focus and direction of sight line of the teacher, selecting a positioning point of the virtual objects in the teaching space by using the interactive methods of voice and gesture; and placing the virtual objects in a corresponding position of the teaching space with an appropriate posture and zoom ratio by considering restrictions of a physical rule on the virtual objects;

(2.1.2) according to requirements of a teaching task, allowing the teacher to move the virtual objects to a wall, a floor, a table, a chair or air in the teaching space through voice, sight, and gesture; and tracking changes of 6 degrees of freedom (DoF) of the virtual objects in the teaching environment through the perception camera to obtain a new position, posture and zoom ratio;

(2.1.3) in the augmented teaching scene, allowing the virtual objects to follow a physical rule similar to that in a real environment; and when the virtual object is placed or moved, adaptively adjusting the position, the posture and the zoom ratio in real time through intersection and collision detection to realize a virtual-real fused display of the augmented teaching scene;

the step (2.2) is performed through steps of:

(2.2.1) collecting lighting information of a surrounding environment by setting the sampling point in the teaching space; calculate the light intensity of the neighboring point of the sampling point by using the bilinear interpolation algorithm; and applying interpolation result to the virtual objects to realize lighting fusion effect in the augmented teaching scene to render the augmented teaching scene more real and three-dimensional;

(2.2.2) according to a type, quantity and position of a light source in the teaching space, placing a depth virtual camera at the position of the light source to determine a scene object whose bounding box falls within a shadow projection range of the virtual objects; and creating a depth texture shadow of a surface model of the scene object using the ShadowMap; and (2.2.3) according to the changes of the position, posture and zoom ratio of the virtual objects, updating a shadow projection area of the virtual objects in the teaching environment in real time; calculating a shadow slope ratio; and according to setting of a depth offset datum, eliminating shadow aliasing effect to realistically present a real-time dynamic shadow effect;

the step (2.3) is performed through steps of:

(2.3.1) according to the positional relationship between the teacher and each virtual object in the augmented teaching scene, based on the rendering mechanism of Raycasting, determining a distance and position relationship between individual virtual objects and the depth virtual camera; and constantly calibrating the depth values of individual virtual objects in the depth buffer and sorting a depth of each virtual object in real time;

(2.3.2) determining a spatial position relationship of individual virtual objects in the augmented teaching scene by using the octree index structure; and accurately tracking the contour of each virtual object in real time from a perspective of the teacher by using the max-flow or min-cut tracking method based on the optical flow method to determine an occlusion relationship and range between virtual and real objects; and (2.3.3) creating some simple planes for displaying white wall areas, complex lighting or impenetrable areas in the teaching space that are difficult to recognize; and occluding the 3D grid structure of the complex areas in the teaching space through translation, rotation and stretching operations to simplify the determination of the occlusion relationship of individual virtual objects in a real space.

2. The method of claim 1, wherein the step (1) is performed through steps of:
   (1.1) formulating a collection standard of a depth sensor, comprising a collection route and a movement speed; according to requirements of the collection standard, collecting a depth data of each virtual object in the teaching space from the multiple trajectories and the multiple angles; and describing a position and a posture of each virtual object in a depth synthesis map by using a right-handed coordinate system;
   (1.2) according to the depth synthesis map, constructing a surface grid model of the teaching space; extracting and generating the 3D model of each virtual object by using the semantic segmentation algorithm; dividing the teaching space by using the octree index structure to construct an index structure of the teaching space to realize rapid intersection and collision processing between the virtual objects; and tracking head movement of the teacher and changes of the direction of the sight line of the teacher to perceive parameter changes of the scene object in the field of view in real time; and
   (1.3) extracting the feature point of each virtual object in the teaching environment by using the heuristic algorithm; wherein the feature point is a vertex of a bounding box of each virtual object setting the feature point as a spatial anchor point to optimize understanding of the teaching space and the 3D model of each virtual object; analyzing a surface geometric feature of the model of each virtual object; extracting a feature plane by using the cluster analysis method; and obtaining a 3D surface model of a visible scene object in the teaching space in real time by using the spatial positioning and real-time mapping technology;
   the step (1.1) is performed through steps of:
   (1.1.1) aiming at teaching spaces with different areas and length-width ratios, formulating a collection route and a movement speed of an active-ranging depth sensor; and collecting the depth data of each virtual object in the teaching space from the multiple trajectories and the multiple angles;
   (1.1.2) wearing a time of flight (ToF) sensor on head of the teacher; according to the requirements of the collection standard, scanning the teaching space to quickly collect the depth data of walls, tables, chairs, a blackboard and a platform; and recording a coordinate value of each depth point in meters by using a single-precision floating point number; and
   (1.1.3) accurately calculating depth maps of the teaching space and its objects collected by multiple sites through an iterative alignment algorithm; splicing the depth maps into a unified coordinate system to generate the depth synthesis map; and describing a position coordinate (x, y, z) and an orientation posture (tx, ty, tz) of each virtual object in the teaching environment by using the right-handed coordinate system;
   the step (1.2) is performed through steps of:
   (1.2.1) according to the depth synthesis map, constructing the surface grid model of the teaching space; extracting and generating the 3D model of each virtual object by using the semantic segmentation algorithm; creating a cuboid bounding box according to a length, a width, a height, a spatial position, an orientation, and a posture feature of each virtual object; and positioning individual objects by using a YOLO algorithm;
   (1.2.2) dividing the teaching space by using the octree structure and constructing the index structure of the teaching space; segmenting and preprocessing each object in the teaching space based on coordinate information of the bounding box of each virtual object; and performing the rapid intersection and the collision processing between the virtual objects according to a positional relationship between individual bounding boxes; and
   (1.2.3) tracking the head movement of the teacher and the changes of the direction of the sight line of the teacher using an acceleration sensor, a gyroscope and a depth perception camera to perceive the scene object in the field of view in real time; and determining position, posture and size and change of a transformation matrix of the scene object relative to an initial state;
   the step (1.3) is performed through steps of:
   (1.3.1) extracting the feature point of each virtual object in the teaching environment by using the heuristic algorithm; setting the feature point as the spatial anchor point, wherein the spatial anchor point is taken as a center of a circle and the 3D model of each virtual object within 3 meters of the spatial anchor point do not deform with change of a scale of the field of view; and optimizing the understanding of the teaching space and the 3D model of each virtual object in the teaching space through the spatial anchor point;
   (1.3.2) analyzing the surface geometric feature of the 3D model of each virtual object; extracting the feature plane of the 3D model of each virtual object by using the cluster analysis method; and according to changes of the position of the teacher and the direction of the sight line of the teacher, obtaining a visible feature plane in the teaching space in real time to enhance the understanding of the teaching space; and
   (1.3.3) positioning a coordinate and a posture of the visible scene object in the teaching space by using the spatial positioning and real-time mapping technology; according to the changes of the position of the teacher and the direction of the sight line of the teacher, obtaining the 3D surface model of the visible scene object in the teaching environment in real time; and eliminating invisible scene objects to improve a processing speed of understanding the teaching environment.

3. The method of claim 1, wherein the step (3) is performed through steps of:
   (3.1) supporting the teacher to manipulate the virtual objects in multiple interactive methods by using the multi-modal algorithm; setting a somatosensory effect of the interactive prompts, wherein the higher mass of each virtual object is, the lower a somatosensory shift level of the virtual hand is; and guiding the teacher to combine perceived spatial cues with a cognitive structure through the interactive prompts of the sight target and the virtual hand;
   (3.2) obtaining a change matrix of the virtual objects moved by the teacher and positioning and updating changes of the virtual objects at different terminals; mapping transformed virtual objects to a localized teaching environment of the different terminals and synchronously mapping an interactive result by using simultaneous localization and mapping (SLAM) technology; and updating the lighting effect and the shadow effect to realize a realistic experience of the virtual objects in the teaching environment; and (3.3) constructing different colliders according to a shape of the surface grid model of each virtual object; calculating next position of a virtual object by using a scanline algorithm to determine whether the virtual object will collide with other virtual objects, thereby performing a corresponding operation; designing the custom Shader; rendering a texture pixel by using a fragment shader; and reconstructing a vertex rendering process;

the step (3.1) is performed through steps of:

(3.1.1) constructing a multi-modal interactive fusion algorithm for vision, hearing and touch in a holographic imaging environment to support the teacher to push, pull, shake and move the virtual objects in the augmented teaching scene through interactive operations of gesture, sight line and head movement, so as to enhance reality of the interactive operations in a teaching process;

(3.1.2) estimating a volume, density and mass of the virtual objects according to properties of the virtual objects; and setting the somatosensory effect of the interactive prompts based on a physical law of gravity, wherein the greater the mass is, the lower the somatosensory shift level of the virtual hand is, such that illusion of offset is weaker to enhance realistic experience of the teacher; and (3.1.3) guiding the teacher to combine the perceived spatial cues with the cognitive structure in the augmented teaching scene through the interactive prompts of the sight target and the virtual hand to enhance natural transition from a real teaching space to a virtual environment, form a matching spatial situation model and enhance perceptual experience of the teacher;

the step (3.2) is performed through steps of:

(3.2.1) allowing the teacher to move the virtual objects in the augmented teaching scene under the guidance of the virtual hand and the sight target according to requirements of a teaching activity; and calculating a transformation matrix of position, posture and scale before and after movement to position and update changes of the virtual objects at different terminals;

(3.2.2) according to requirements of the teacher and a student to share the augmented teaching scene, mapping a transformation parameter of the virtual objects to the localized teaching environment of a student terminal by using the SLAM technology, so as to realize consistent mapping on different terminals and relative position mapping with other scene objects; and (3.2.3) allowing the teacher to manipulate the virtual objects by using a multi-modal interaction mode to present a new position, posture and zoom ratio of the virtual objects in an augmented teaching environment by using a holographic imaging system; and according to a relative relationship between the light source and the virtual objects, updating the lighting effect and the shadow effect to make the virtual objects in the teaching environment produce a realistic experience effect;

the step (3.3) is performed through steps of:

(3.3.1) constructing different colliders according to the shape of the surface grid model of each virtual object in the augmented teaching scene; and quickly detecting collision between the virtual object and other objects by using an Opcode method;

(3.3.2) allowing the teacher to move, rotate and scale the virtual objects in the augmented teaching scene through the interactive methods of gesture and sight line; calculating the next position, posture and proportion of the virtual objects by using the scanline algorithm to determine whether the virtual objects collide with other objects; and if the virtual objects collide with other objects, stopping moving the virtual objects or performing an obstacle avoidance operation; and (3.3.3) in an interactive process of the augmented teaching scene, designing the custom shader by considering a bandwidth, a cache behavior and a filtering indicator in a rendering pipeline; rendering the texture pixel by using the fragment shader; and reconstructing a vertex rendering process to meet requirements for real-time dynamic update of light, shadow and animation.

* * * * *